Patented June 6, 1950

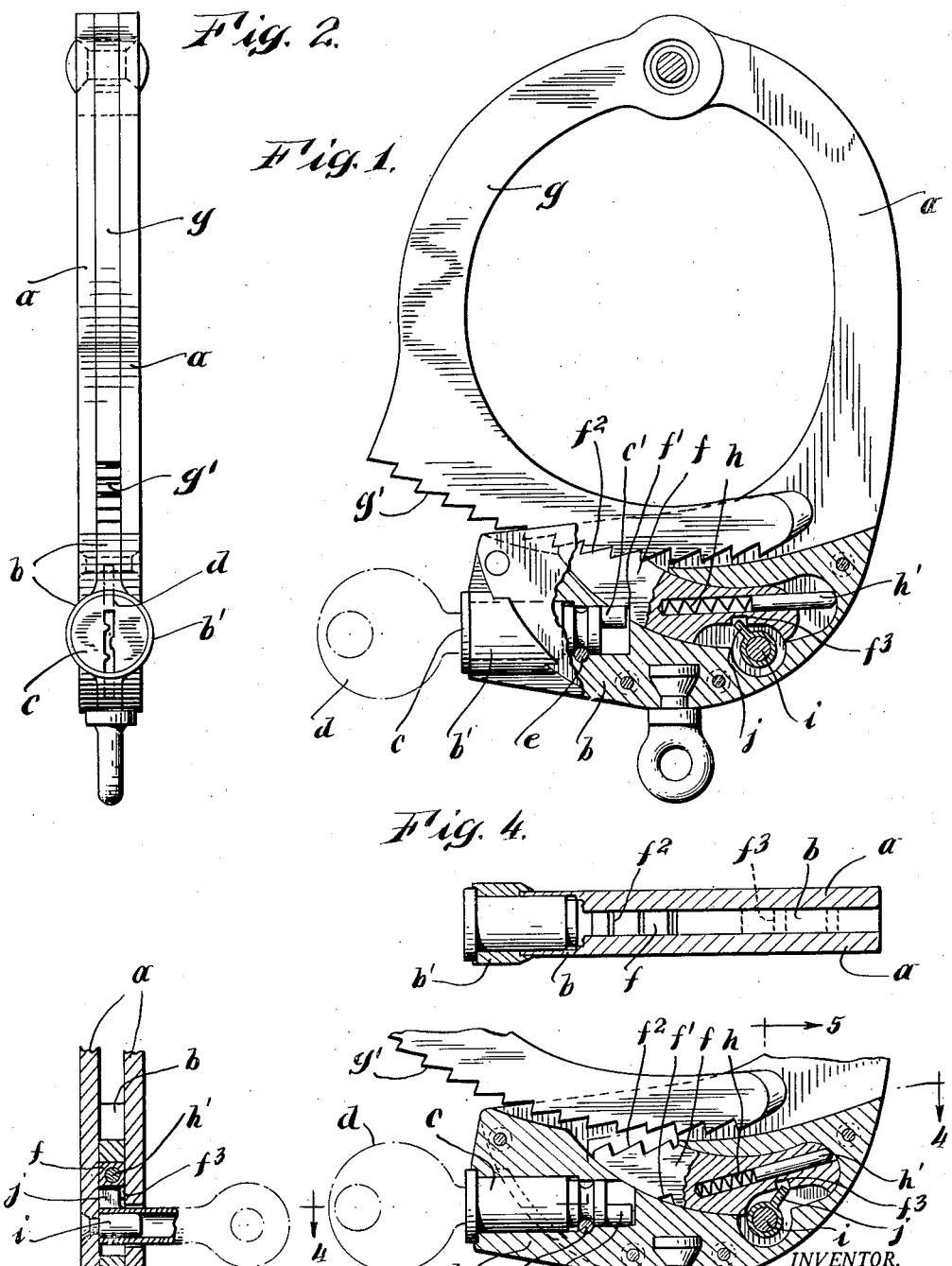

2,510,294

UNITED STATES PATENT OFFICE 2,510,294

MANACLE

Alexis Rivolier, Saint-Etienne, France

Application January 9, 1948, Serial No. 1,413
In France January 9, 1947

5 Claims. (Cl. 70—16)

It is very important for the reliable operation of a manacle for its members to be sufficiently rigid so that it may resist considerable stresses while its bulk and weight are reduced to make its transportation and use as easy as possible. I have therefore designed a manacle incorporating a simple arrangement of strong members associated with a special locking means providing a fully reliable manacle and preventing radically any untimely opening through impact or the like unauthorized operation.

I have illustrated by way of example and by no means in a binding sense a preferred embodiment of my invention, as shown by way of example in accompanying drawings, wherein:

Fig. 1 illustrates the safety manacle in side view, the front flange being removed and the manacle being closed and locked while the releasing key for the catch in the control means is positioned so as to move the catch away from the teeth on the pivoting arm.

Fig. 2 is an outer side view corresponding to Fig. 1.

Fig. 3 is a partial side view of the safety manacle after removal of the front flange, the manacle being in its open position while the catch has disengaged the teeth on the pivoting arm.

Fig. 4 is a sectional view taken on line 4—4 of Fig. 3.

Fig. 5 is a sectional view taken on line 5—5 of Fig. 3.

This improved safety manacle includes:

Two parallel spaced flanges $a$ the outlines of which are exactly similar and between the lower enlarged portions of which is riveted an intermediary bridge $b$. The narrow upper portions of similar outline of said flanges form the actual stationary portion of the manacle.

To the upper end of said flanges and between same is pivotally secured the arm $g$, which latter is held on a stay or washer rockably carried by a spindle riveted between the cooperating ends of the two flanges. Said pivoting arm $g$ is shaped so as to form inwardly a curve adapted to cooperate with the inner curve formed by the stationary arm constituted by the spaced flanges $a$ while the lower part of said arm $g$ forms a circular segment adapted to move between said flanges $a$. On the terminal circular segment of the arm $g$ are cut teeth $g^1$ adapted to engage corresponding teeth $f^2$ cut at the end of the catch $f$ carried by the flange system. It should be noticed that the cooperating teeth on the arm $g$ and on the catch are given a corresponding suitable slope so as to allow a free rocking of the teeth $g^1$ over the catch when engaging the arm $g$ carrying them between the flanges $a$ while in the opposite direction the arm $g$ cannot be released without rocking the catch by reason of the teeth $g^1$ engaging and being held back by the teeth $f^2$ on the catch $f$.

The catch $f$ assumes the shape of an arcuate segment and is adapted to move in a recess of corresponding shape provided in the intermediary bridge member $b$ connecting the lower ends of the flanges. The center of the arcuate system constituted by the catch and its recess is shifted eccentrically with reference to the center of the circular toothed segment of the pivoting arm $g$ formed on the pivoting arm $g$ coaxially with the pivot for the latter so that the teeth $f^2$ may engage and disengage as required the teeth $g^1$.

A spring $h$ housed inside a bore in the catch $f$ and acting on a pusher member $h^1$ adapted to abut against the bottom of the recess provided for the catch provides for a permanent pressure on the said catch that urges the latter forwards for engagement between the teeth $f^2$ and the teeth $g^1$ on the pivoting arm $g$.

The catch $f$ is provided with a clearance at $f^3$ so as to form a notch corresponding with the nose of a key-shaped member $j$ rotatably carried on a pivot $i$ rigid with one of the flanges $a$, while the other flange is provided with an opening for introducing said key onto said pivot and the intermediary bridge member $b$ shows a small semi-circular clearance for the passage of said key through it.

To either side of the intermediary bridge member $b$ is provided a circular boss $b^1$ including an annular projection adapted to cover the ends of the flanges $a$ (Fig. 4). Said boss $b^1$ is bored to form a bearing for the stationary casing of the small drum $c$ that is axially held in position by means of a transversal pin or screw $e$ secured to the flanges $a$ and holding the drum $c$ through engagement in an annular groove provided in said drum without preventing rotation of the latter round its axis.

The outer end of the drum $c$ is further provided with a diametrical slot of a particular shape inside which may be introduced a correspondingly shaped flat key $d$; the operation of said flat key allows rotating the small drum carrying it and thereby shifting aside through an annular displacement an eccentric round projection $c^1$ carried by the inner end of the drum $c$. It is possible thereby either to engage the projection $c^1$ into a notch $f^1$ in the catch $f$ as shown in Fig. 1 in order to lock said catch in the position corresponding to the closing of the pivoting arm $g$, or else to release the projection $c^1$ from said notch $f^1$ so as to allow operating the first key $g$ whereby the catch $f$ is shifted longitudinally of its recess and the teeth $f^2$ are released with reference to the teeth $g^1$ so that the arm $g$ carrying the latter may open as shown in Fig. 3.

In operation, when the parts are positioned as shown in Figure 1, the movable arm $g$ is held in a slot position as indicated by means of the catch $f$. In this position, the movable arm $g$ is incapable of being moved in either direction. When, however, the key $d$ is inserted and the drum $c$ is rotated to assume the position shown in Figure 3, the projection $c^1$ is rotated and is thereby removed from the notch $f^1$. At this point, the arm $g$ may be moved inwardly only, as the teeth $g^1$ of the movable arm $g$ may slide over the teeth $f^2$ formed on the catch $f$. However, the arm $g$ may not move outwardly because of the engagement of the aforementioned teeth. In order to permit release of the arm $g$, the key-shaped member $j$ which is inserted so as to encircle the pivot $i$ is rotated so as to enter the clearance $f^3$ forming the catch $f$ to move the catch $f$ against the pressure of the spring $h$ to move the catch to the position shown in Figure 3. In this position, the arm $g$ may be swung outwardly to free itself from the main body of the manacle. It should be noted that the catch $f$ is arcuately shaped and is slidably mounted within an arcuately shaped recess. Accordingly, the movement of the catch is curvilinear. By providing such a movement for the catch, it is extremely difficult, if not impossible, to move the catch except by the key camming operation aforementioned.

In the manacle thus designed, the parts and their relative cooperation are extremely simple, which allows under a reduced bulk to give said parts a stout conformation while the manacle operates in an exceedingly reliable manner through cooperation with the drum operated locking means and the engagement of the teeth on the catch and on the pivoting arm cannot be tampered with by any unauthorized person.

I claim:

1. A safety manacle comprising a stationary arm provided with an arcuate recess at one end, a cooperating movable arm pivotally secured to the other end of the stationary arm and provided with an arcuate series of teeth at the distal end thereof, an arcuate shaped toothed catch slidably carried for curvilinear movement inside the recess of the stationary arm and adapted to engage in its outer position the teeth on the movable arm for locking said arm with reference to the stationary arm, spring means for normally positioning the catch in its outer position, and means for locking said catch in its outer position in engagement with the teeth on the pivoting arm.

2. A safety manacle comprising a stationary arm including two parallel spaced arm elements and a bridge member securing the outer ends thereof together and provided with an arcuate recess opening towards the corresponding end of the stationary arm elements, a cooperating movable arm pivotally secured to the other end of the stationary arm and provided with an arcuate series of teeth at the distal end thereof, an arcuate shaped toothed catch slidably carried for curvilinear movement inside the recess of the stationary arm and adapted to engage in its outer position the teeth on the movable arm for locking said arm with reference to the stationary arm, means yieldingly urging the catch to its outer position, movable means for engaging the catch and urging it inwardly against the action of said yielding means away from the teeth on the pivoting arm, and means for locking said catch in its outer position in engagement with the teeth on the pivoting arm.

3. A safety manacle comprising a stationary arm provided with an arcuate recess at one end, a cooperating movable arm pivotally secured to the other end of the stationary arm and provided with an arcuate series of teeth at the distal end thereof, an arcuate shaped toothed catch slidably carried for curvilinear movement inside the recess of the stationary arm and adapted to engage in its outer position the teeth on the movable arm for locking same with reference to the stationary arm, spring means for normally positioning the location of the catch in the outer position, a rotary member mounted in the first end of the stationary arm and adapted to rotate therein, means preventing any sliding movement of said rotary member, said rotary member having a locking projection and movable to an operative position in which it locks the catch in its outer position and to an inoperative position in which it releases said catch for curvilinear movement.

4. A safety manacle comprising a stationary arm provided with an arcuate recess at one end, a cooperating movable arm pivotally secured to the other end of the stationary arm and provided with an arcuate series of teeth at the end thereof opposed to the pivoting end, an arcuate shaped toothed catch slidably carried for curvilinear movement inside the recess of the stationary arm and adapted to engage in its outer position the teeth on the movable arm for locking same with reference to the stationary arm, spring means for normally positioning the location of the catch in the outer position, a rotary member mounted in the first end of the stationary arm, means preventing any longitudinal shifting of said rotary member with reference to the stationary arm, an eccentric stud carried by said rotary member and adapted to engage and disengage the catch according to the angular position of the rotary member for selectively locking the catch in its outer teeth-engaging position and for releasing same for curvilinear sliding movement.

5. A safety manacle comprising a stationary arm provided with an arcuate recess at one end, a cooperating movable arm pivotally secured to the other end of the stationary arm and provided with an arcuate series of teeth at the end thereof opposed to the pivoting end, an arcuate shaped toothed catch slidably carried for curvilinear movement inside the recess of the stationary arm, said catch having a notch on its outer surface, said catch in its outer position being adapted to engage the teeth on the movable arm for locking the movable arm with reference to the stationary arm, spring means for normally positioning the location of the catch in its outer position, a cylindrical boss at the end of the stationary arm in close proximity with the end of the recess therein and provided with a cylindrical bore, a drum adapted to rotate in said bore and provided with a slot for a rotation controlling key, means for preventing any sliding movement of the drum in its bore, an eccentric stud carried at the end of the drum for engaging and disengaging the notch in the catch according to the angular position of the drum respectively for locking said catch in its outer position and releasing same for curvilinear sliding movement.

ALEXIS RIVOLIER.

REFERENCES CITED

The following references are of record in the file of this patent:

UNITED STATES PATENTS

| Number | Name | Date |
| --- | --- | --- |
| 614,312 | Voight | Nov. 15, 1898 |
| 1,722,525 | Junkunc | July 30, 1929 |
| 1,775,727 | Latou | Sept. 16, 1930 |
| 1,851,207 | Neal | Mar. 29, 1932 |
| 1,855,687 | Neal | Apr. 26, 1932 |